May 23, 1933.  A. M. HERBSMAN ET AL  1,909,955
COMPOUND PUMP
Filed March 13, 1931  3 Sheets-Sheet 2
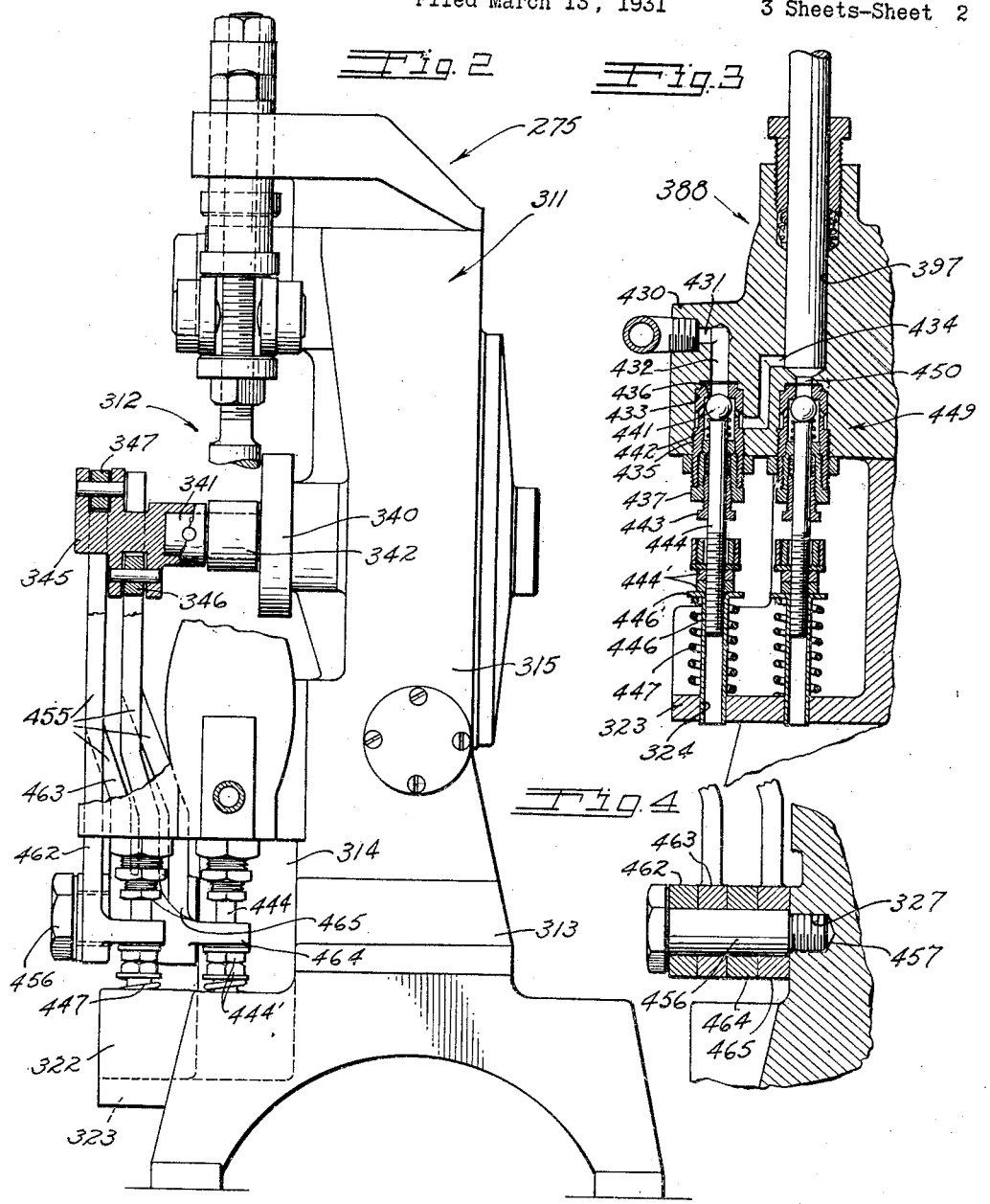
INVENTORS:
ABRAHAM M. HERBSMAN,
RODNEY B. CAMPBELL,
BY
ATTORNEY.

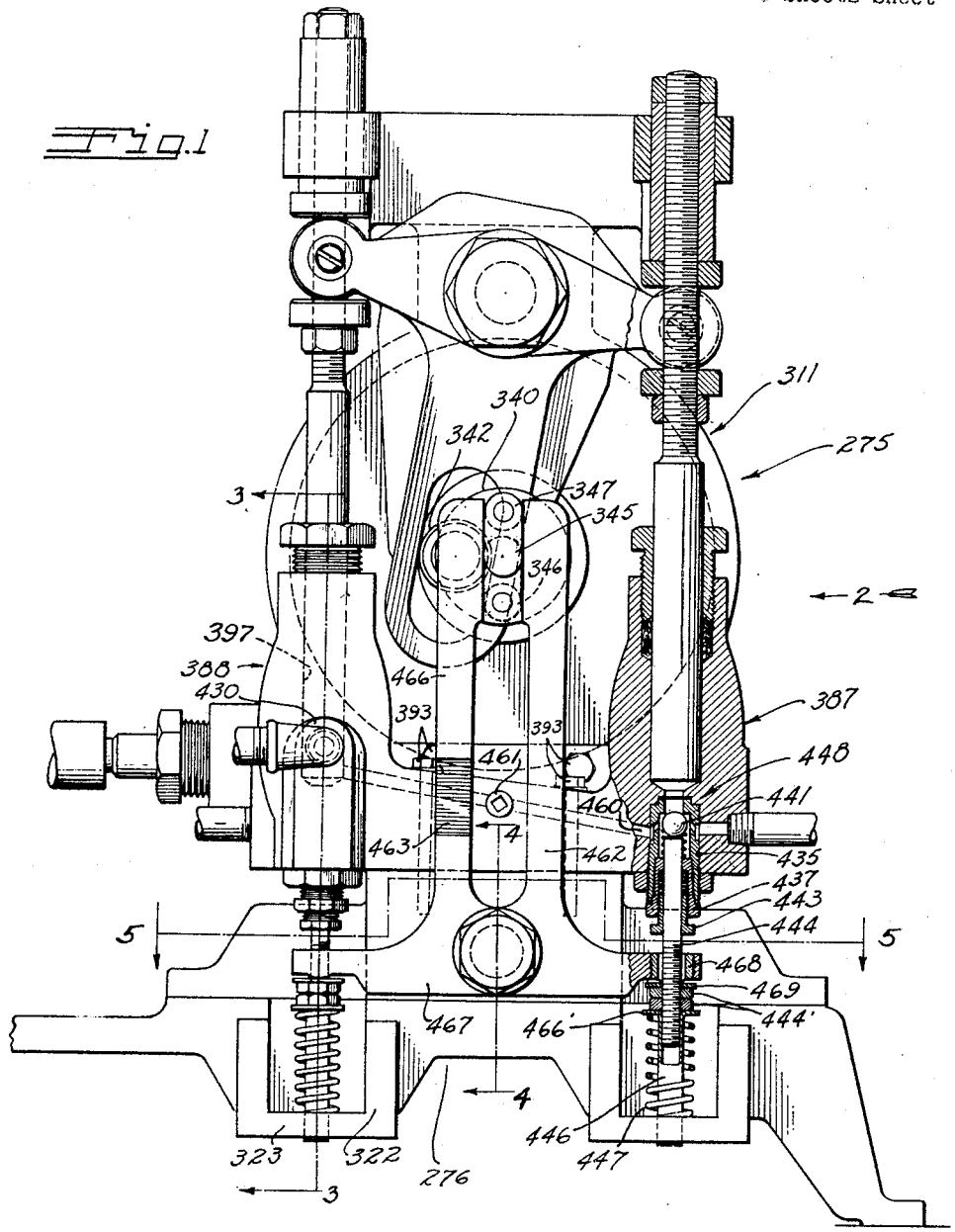

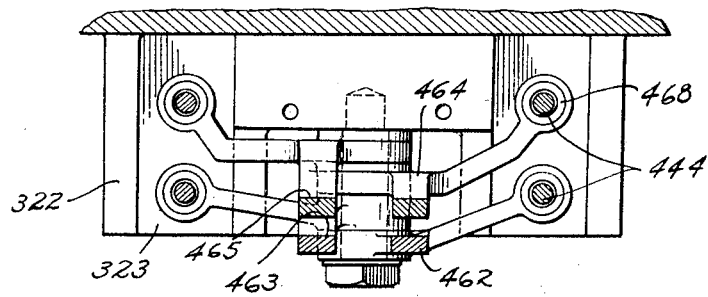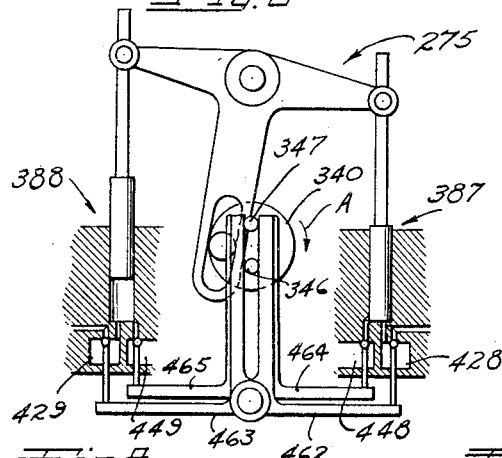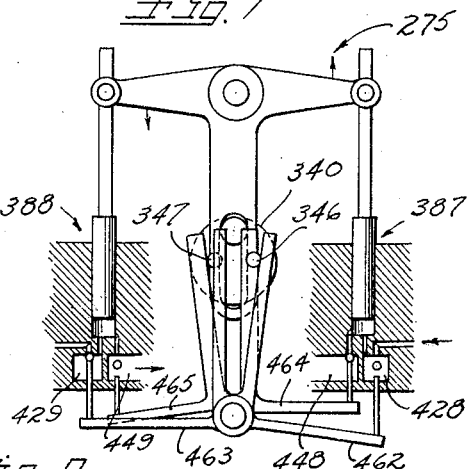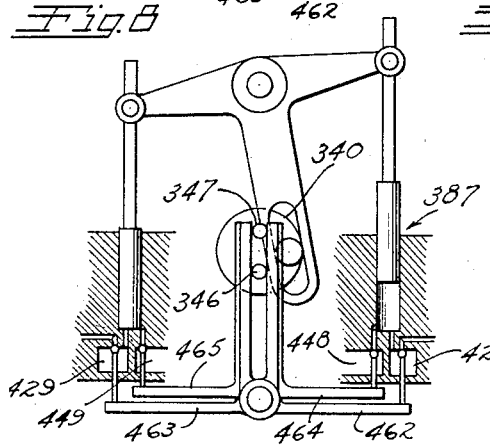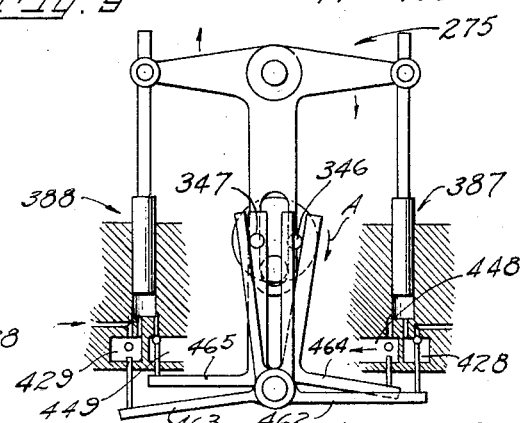

Patented May 23, 1933

1,909,955

UNITED STATES PATENT OFFICE

ABRAHAM M. HERBSMAN, OF HUNTINGTON PARK, AND RODNEY B. CAMPBELL, OF WALNUT PARK, CALIFORNIA; SAID CAMPBELL ASSIGNOR TO SAID HERBSMAN

COMPOUND PUMP

Application filed March 13, 1931. Serial No. 522,378.

Our invention relates to the pumping art and more particularly to a novel apparatus for feeding liquids into pressure lines.

Although useful in many arts, our invention was produced especially for feeding liquid chemicals into lines carrying a petroleum emulsion under high pressure and in this application a preferred embodiment adapted to this purpose is illustrated and described.

In the petroleum industry the oil is frequently taken from the wells in the form of an emulsion of oil and water. Before the oil can be refined it must be separated from the water. The processes devised for this purpose include mixing a chemical with the emulsion which tends to coagulate the dispersed phase so that this will readily separate out by gravity.

The breaking down of each of these emulsions presents a different chemical problem and a special formula is generally prepared for treating the product of each well or associated group of wells.

The chemical treating of an emulsion to break this down usually involves mixing the treating chemical with the emulsion, agitating the treated emulsion for a period of time, and then placing the emulsion in a settling tank where the coagulated water globules may separate out and the clear oil be drawn off. One way in which the treatment may be carried out without requiring special apparatus is to inject into an oil line, carrying petroleum emulsion from a well to a storage tank, the proper amount of the special chemical which is capable of causing this emulsion to break down. In the storage tank the emulsion phases stratify and are separately drawn off.

Injection of the chemical into the oil lines presents certain problems. To begin with, the treating chemical sometimes consists of two liquids which for maximum effectiveness should be freshly mixed just before being injected into the emulsion. Furthermore, these liquids must be mixed in a definite proportion, and the mixture injected in definite quantities into the emulsion stream.

It is an object of our invention to provide an apparatus for feeding liquids into pressure lines which will accomplish the mixing and injecting of a plurality of chemicals in definite proportions and quantities.

It is another object of our invention to provide such an apparatus which may be readily adjusted to determine the proportions and quantities of chemicals injected.

It is a further object of our invention to provide a novel compound pump which may be used to carry out the method above indicated or may be used to feed a plurality of chemicals separately to an equal number of pressure lines.

The manner of accomplishing the foregoing objects as well as further objects and advantages, will be made manifest in the following description, together with the accompanying drawings, in which:

Fig. 1 is a front elevational view of a preferred embodiment of the pump of our invention partially broken away to illustrate details of construction.

Fig. 2 is a side elevational view taken in the direction of the arrow 2 in Fig. 1.

Fig. 3 is a fragmentary vertical sectional view illustrating the valves of the pump shown in Fig. 1, taken on the line 3—3 of this figure.

Fig. 4 is a fragmentary vertical elevational view taken on the line 4—4 of Fig. 1, illustrating in details the mounting of valve rockers.

Fig. 5 is a fragmentary horizontal sectional view taken on the line 5—5 of Fig. 1.

Figs. 6 to 9 inclusive are diagrammatic views illustrating the operation of the pump shown in Fig. 1.

Referring specifically to the drawings, we have shown therein a preferred embodiment 275 of the pump of our invention, one feature of which is the provision of a valve seating means 276, the principal purpose of which is to seat the inlet and exhaust valves of the pump by the action of heavy springs at the proper time for these valves to close, and to positively release these valves from this spring action when it comes time for the valves to open. Especially good results have been obtained with the pump 275 when handling heavy liquids which it is not practical to pump with valves automatically spring operated.

The pump 275 includes an operating unit 311 and a pump unit 312. The operating unit 311 includes a frame 313 having a table 314 formed on a front portion thereof and a gear box 315 extending upwardly therefrom. The frame 313 has a pair of spring cradles 322 formed integrally with a front portion thereof, the cradles 322 having floors 323 provided with suitable guide apertures 324.

Provided in the front face of the table 314 is a threaded aperture 327, the purpose of which will be made manifest hereinafter.

The pin 341 extends forwardly from the crank plate 340 and carries a roller 342, and has pinned on the front end thereof a rocker actuator 345. This actuator has rollers 346 and 347 mounted thereon in eccentric positions and staggered as shown in Fig. 2.

The pump unit 312 includes two single action pumps 387 and 388 embodied in a casting 390 which sits upon the table 314 and is rigidly secured to the frame 313 by cap screws 393. The pumps 387 and 388 have inlet valves 428 and 429 respectively. Each of these inlet valves has a body 430 which is integral with the body 390 and extends forwardly therefrom. Formed in the body 430 is an inlet opening 431, a port 432 connecting this to a valve chamber 433, and a port 434 connecting this chamber with the lower end of one of two pump chambers 396 and 397 provided respectively in the single action pumps 387 and 388. Each of the valve chambers 433 is threaded and a valve cage 435 is screwed thereinto so as to permit communication between the passages 432 and 434 through a valve seat 436.

Screwed into the cage 435 is a packing box 437 which traps a valve ball 441 which constantly urges this ball against the seat 436, in which position the valve is closed. The packing box 437 has a packing gland 443 screwed upwardly therein to form a fluid-tight connection with a valve push rod 444 which extends upwardly through the gland and through a spring 442 into contact with the ball 441. The rod 444 is in vertical alignment with one of the apertures 324 in the cradle floor 323 disposed therebeneath, and a sleeve 446 slides in this aperture and snugly receives the lower end of the rod 444. At its upper end the sleeve 446 has a flange 446′ which is held against a pair of lock nuts 444′ on the rod by a strong compression spring 447 coiled about the sleeve. This of course presses upwardly upon the end 444 so as to urge it tightly against the valve ball 441.

Provided in the body 390 just beneath the pump chambers 396 and 397 respectively are outlet check valves 448 and 449 which are identical in construction with the inlet valves 428 and 429 and which communicate respectively with the pump chambers 396 and 397 through exhaust ports 450. The exhaust side of the valve 448 connects with an exhaust passage 460 which leads to the lower end of the pump chamber 397 and has a stop cock 461 provided therein.

The valve control mechanism 276 includes the rocker actuater 345 described hereinabove, and four rockers 455, which are rotatably mounted on a pin 456 having a threaded end 457 of reduced size which screws into the threaded aperture 327 in a front face of the table 314.

The rockers 455 may be separately distinguished by reference numerals 462, 463, 464, and 465, and each of these rockers has an upright arm 466 and a lateral arm 467. The lateral arm 467 of each rocker 455 has a bushing 468 removably mounted on its outer end, which is disposed about one of the push rods 444, and the bushings 468 have curved downward projections which bear against wear washers 469 disposed between these bushings and the uppermost of the lock nuts 444.

Referring to Fig. 5, it is noted that owing to the positioning of the arms 467, the rockers 455 are respectively adapted to control the inlet and outlet valves of the pump 275 as follows:

The rocker 462 controls the inlet valve 428; the rocker 463, the inlet valve 499; the rocker 464, the outlet valve 448; and the rocker 465, the outlet valve 449. The upright arms 466 of the rockers 462 and 463 are disposed on opposite sides of the roller 347, and the upright arms of the rockers 464 and 465 are disposed on opposite sides of the roller 346, as clearly shown in Figs. 1 and 2.

The operation views, Figs. 6 to 9 inclusive, clearly illustrate the operation of the valve control mechanism 276.

In Fig. 6, the pump 275 is shown with all of the valves closed and with the pump 387 ending an exhaust stroke and the pump 388 ending an intake stroke. In this figure the parts of the pump are positioned just as shown in Figs. 1 and 2. The plate 340 at all times turns in the direction of the arrow A, and in Fig. 7 is shown after a quarter revolution from the position in which it is shown in Fig. 6. Here the rockers 462 and 465 are moved downwardly, compressing the springs 447 therebeneath and leaving the balls 441 in the valves 428 and 449 free to move downwardly so that liquid may be drawn into the pump 387 and expelled from the pump 388.

In Fig. 8 the plate 340 has turned another quarter revolution, the rollers 346 and 347 are again in vertical alignment, and none of the rockers 455 are actuated. Here, the pump 387 has just completed an intake stroke and the pump 388 an exhaust stroke.

In Fig. 9 the plate 340 has turned three-fourths of a revolution from the position in which it is shown in Fig. 6 and the pump 387 is in the midst of an exhaust stroke and the pump 388 in the midst of an intake stroke. Here the rockers 463 and 464 are rocked so as to relieve pressure on the balls 441 of the valves 429 and 448.

In all of the Figs. 6 to 9 inclusive, where any of the rockers 455 are not actuated by the rollers 346 and 347, the balls 441 of the valves controlled by these rockers are held tightly against their respective seats by the springs 447.

It is thus seen that in case the pump 275 is used to handle a heavy liquid, prompt and positive controlling of the valves is accomplished without providing for the opening of any of the valves until the pressure at the valve actually changes direction. This insures a maximum of efficiency in the pump and has been found to permit very accurate adjustment for the purpose of measuring the proportionate quantities of fluids pumped by the two pump units 387 and 388.

What we claim is:

In a liquid pump, the combination of: primary and secondary pumps; a walking beam opposite ends of which are adapted to actuate said pumps; an arm provided on said walking beam; a power shaft having an eccentric member thereon associated with said arm for rocking said beam to operate said pumps; relatively easily operated inlet and exhaust valves in said pumps; a cam member mounted on said eccentric member; a series of rockers pivotally mounted on said pump and adapted to be actuated by said cam member; and relatively strong spring means for normally closing said valves, said rockers operating to relieve each of said valves of the pressure of said strong spring means as it becomes necessary for that particular valve to open and replacing said pressure when it becomes necessary for this valve to close.

In testimony whereof, we have hereunto set our hands at Los Angeles, California, this 28th day of February, 1931.

ABRAHAM M. HERBSMAN.
RODNEY B. CAMPBELL.